United States Patent

[11] 3,620,981

| [72] | Inventors | Eugene F. Magoon<br>Berkeley;<br>Lawrence G. Cannell, Berkeley; John H.<br>Raley, Walnut Creek, all of Calif. |
|---|---|---|
| [21] | Appl. No. | 689,260 |
| [22] | Filed | Dec. 11, 1967 |
| [45] | Patented | Nov. 16, 1971 |
| [73] | Assignee | Shell Oil Company<br>New York, N.Y. |

[54] HETEROGENEOUS CATALYST COMPOSITIONS
5 Claims, No Drawings

[52] U.S. Cl. ........................................................ 252/429 R,
  252/431 R
[51] Int. Cl. .......................................................... B01j 11/84
[50] Field of Search ........................................... 252/429,
  430, 431

[56] References Cited
UNITED STATES PATENTS

| 2,912,423 | 11/1959 | Peters et al. ................... | 252/430 X |
| 3,134,824 | 5/1964 | Walker et al. ................. | 252/430 X |
| 3,379,706 | 4/1968 | Wilke ............................ | 252/429 X |
| 3,398,168 | 8/1968 | Wilke ............................ | 252/431 X |
| 3,424,777 | 1/1969 | Wilke ............................ | 252/431 X |
| 3,435,058 | 3/1969 | Rinehart ....................... | 252/429 |

*Primary Examiner*—Daniel E. Wyman
*Assistant Examiner*—C. F. Dees
*Attorneys*—Howard W. Haworth and John H. Colvin

ABSTRACT: Catalyst compositions comprising certain hydrocarbon-transition metal halide complexes supported on an acidic, inorganic oxide support are useful in the oligomerization or polymerization of olefins.

HETEROGENEOUS CATALYST COMPOSITIONS

BACKGROUND OF THE INVENTION

It is well known that many transition metal halide complexes and compounds are useful in the conversion of lower molecular weight olefins to products of higher molecular weight, e.g., to oligomers such as dimers or trimers, or to polymers of substantial molecular weights. The Belgian Pat. No. 640,535 issued Nov. 28, 1963 to Shell Internationale Maatschappij, N. V., describes a process wherein a homogeneous oligomerization catalyst prepared from hydrocarbon-soluble nickel salts and an alkyl aluminum halide is employed to oligomerize olefins. The use of soluble transition metal halide systems to catalyze olefin polymerization to high-molecular-weight products, e.g., polyethylene or polypropylene, is well-documented in the field of what is known as "Ziegler chemistry." Although utilization of homogeneous catalysts affords useful product mixtures, the catalysts are relatively unstable upon attempted storage and must be prepared in situ immediately prior to use.

SUMMARY OF THE INVENTION

It has now been found that improved catalyst compositions for converting olefins to products of higher molecular weight comprise hydrocarbon complexes of transition metal halides supported upon an acidic inorganic oxide support, which support has optionally been pretreated with an alkyl aluminum compound. The heterogeneous hydrocarbon-insoluble catalyst compositions are characterized by greater stability during production, storage and utilization, while retaining a high level of catalyst activity.

DESCRIPTION OF PREFERRED EMBODIMENTS

The Catalyst. The olefin conversion catalyst composition comprises a hydrocarbon complex of certain transition metal halides supported on an acidic inorganic oxide catalyst support, which support is optionally pretreated with an alkyl aluminum compound prior to the incorporation of the transition metal halide complex.

The transition metal-containing catalyst component is a transition metal halide moiety complexed with a hydrocarbon olefinic moiety which additionally, in some modifications, is bonded to the transition metal moiety. Broadly speaking, the hydrocarbon transition metal halide complex is represented by the formula $$(L)_m MX_n \quad (I)$$

wherein L represents a hydrocarbon olefinic moiety, M represents a transition metal, X represents halogen, $m$ is a whole number from one to two inclusive and $n$ is a whole number from one to two inclusive.

The term "M" represents a transition metal and useful catalysts are prepared from a wide variety of transition metals, particularly the transition metals of Groups VIb and VIII of the Periodic Table, e.g., the metals chromium, molybdenum, tungsten, iron, cobalt, nickel, rhodium, platinum, and osmium. Particularly useful catalysts, however, are obtained with hydrocarbon transition metal complexes wherein the transition metal is nickel, chromium, rhodium or palladium.

The "X" term of the above formula (I) represents halogen, e.g., fluorine, chlorine bromine, or iodine, but preferably is halogen of atomic number from 17 to 35 inclusive, i.e., the middle halogens chlorine and bromine.

The "L" term of the above formula (I) is a hydrocarbon olefinic moiety of from two to 12 atoms which is chemically bonded and/or complexed through electron donation to the transition metal.

In one instance where the hydrocarbon olefinic moiety is bonded to as well as complexed with the metal moiety, the resulting complex is a π-allyl metal halide. Such complexes are characterized by electron sharing between the metal and the allyl moiety where the electron contribution of the π-allyl moiety is delocalized among three contiguous carbon atoms. In generic terms, the π-allyl metal halides useful as a catalyst composition component are represented by the formula

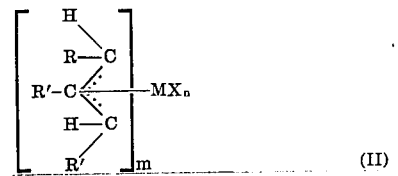

(II)

wherein M, X, $m$ and $n$ have the previously stated significance with the proviso that the sum of $m$ and $n$ is equal to the valence of the metal M, R and R' independently are hydrogen, alkyl of up to eight carbon atoms, phenyl or alkaryl of up to eight carbon atoms with the proviso that R and one R'' together may form a divalent aliphatic moiety of up to one additional olefinic double bond as the sole carbon-carbon unsaturation and of two to 10 carbon atoms, and the dotted line designation represents the electronic delocalization among the three illustrated contiguous carbon atoms. When considered as a whole, preferred π-allyl moieties have from three to 12 carbon atoms and are otherwise free from aliphatic unsaturation. Although many π-allyl metal halide complexes probably exist independently in the form of a dimer, for convenience and simplicity the π-allyl metal halides are herein depicted and named as monomeric complexes.

Illustrative of suitable π-allyl metal halides of the above formula (II) are π-allynickel chloride, π-crotylnickel bromide, π-methallylnickel chloride, π-cyclohexenylnickel bromide, π-2-phenylallyl-nickel chloride, π-2-tolylallylnickel bromide, π-allylpalladium chloride, π-ethallylpalladium bromide, π-cyclododecenylpalladium chloride, bis(π-allyl)chromium chloride, bis(π-cyclooctenyl)chromium chloride, bis(π-allyl)chromium bromide, bis(π-crotyl)chromium chloride, bis(π-allyl)rhodium chloride, bis(π-ethallyl)rhodium bromide, bis(π-cyclohexenyl)rhodium chloride and bis(π-methallyl)rhodium chloride.

A second class of suitable hydrocarbon transition metal halide complexes comprises those compounds of the above formula (I) wherein L represents an olefin molecule which is complexed with but not bonded to the transition metal. In a preferred modification, the olefin complexes are represented by the formula

(III)

wherein R, R', M, X, $m$ and $n$ have the previously stated significance with the proviso that $n$ is the valence of M. Considered as a whole, the olefin moiety has from two to 12 carbon atoms, preferably two to eight carbon atoms.

Illustrative of suitable olefin transition metal halide complexes of the above formula (III) are 1,5-cyclooctadienenickel bromide, 1,5-cyclooctadienepalladium dichloride, ethylenepalladium dichloride, 1,5-cyclooctadiene palladium dichloride, diethylenerhodium(I) chloride, and bis(1-butene)rhodium(I) bromide.

In general, transition metal chloride complexes are preferred over the corresponding bromide complexes. The olefin complexes of rhodium and palladium are the more useful complexes of those metals although the preferred catalyst compositions incorporate π-allyl complexes of nickel and chromium.

The catalyst support comprises a normally solid, acidic, inorganic oxide material containing a major proportion of at least one oxide component selected from silica, alumina and boria. Such materials are known as refractory oxides and include synthetic components as well as acid-treated clays and similar materials or crystalline aluminosilicates known in the art as molecular sieves. Synthetic refractory oxides are preferred over naturally occurring materials or molecular sieves and exemplary acidic synthetic refractory oxides include silica, silica-alumina, silica-magnesia, silica-zirconia, boria-alumina, silica-alumina-boria, silica-alumina-zirconia, silica-alumina-magnesia, and silica-titania-zirconia. Preferred refractory oxide supports are siliceous refractory oxides, that is, refractory oxides containing silica as the major component, and particularly preferred as the siliceous refractory oxide is silica-alumina.

The supported catalyst compositions are produced by intimately contacting the hydrocarbon transition metal halide complex and the acidic oxide support by conventional contacting techniques, as by contacting a solution of the complex in a hydrocarbon solvent with the support for a time sufficient to allow interaction between the transition metal complex and the support. The contacting is preferably effected in an inert reaction environment, that is, one essentially free from reactive materials such as water and oxygen. The proportion of transition metal halide complex to be incorporated into the catalyst composition is not critical so long as sufficient transition metal halide complex is present to allow adequate olefin-catalyst contact during the olefin conversion process. Amounts of hydrocarbon transition metal halide complex from about 3 percent by weight to about 14 percent by weight based on total catalyst composition are satisfactory with amounts from about 5 percent by weight to about 10 percent by weight on the same basis being preferred.

No special pretreatment of the catalyst support prior to contact with the metal halide complex is required, but better results are obtained if the support has been calcined at temperatures from about 450° to about 600° C. for a period of 3 to 6 hours prior to the formation of the catalyst composition. Best results are obtained in an olefin conversion process and catalyst compositions of greatest activity are obtained when an additional pretreatment operation is utilized which comprises pretreating the catalyst support with an alkyl aluminum compound. The precise function of the pretreatment operation is not entirely understood but it is considered that treatment with alkyl aluminum compound serves to modify the acidic sites on the catalyst support as by replacing at least a portion of the acidic protons with aluminum moieties. The alkyl aluminum compound employed in the optional but preferred support pretreatment is a trialkylaluminum, an alkylaluminum dihalide or a dialkylaluminum halide. Generically, these alkyl aluminum compounds are represented by the formula

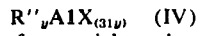
$$R''_y AlX_{(3-y)} \quad (IV)$$

wherein R'' is alkyl of up to eight carbon atoms, preferably of up to four, X has the previously stated significance and y is a whole number from one to three inclusive. Illustrative of such alkyl aluminum compounds are triethylaluminum, tripropylaluminum, triisobutylaluminum, trioctylaluminum, diethylaluminum chloride, propylaluminum dibromide, dihexylaluminum bromide, ethylaluminum dichloride, dibutylaluminum chloride and octylaluminum dichloride. In most applications, the preferred class of alkyl aluminum compounds comprises the alkylaluminum dihalides, particularly the alkylaluminum dichlorides.

The amount of alkyl aluminum compound to be employed in pretreatment of the catalyst support is not critical and as previously stated, no pretreatment is required. In the modifications wherein pretreatment is utilized, however, treatment of the catalyst support with up to about 30 percent by weight, preferably with up to about 20 percent by weight, of alkyl aluminum compound based upon the refractory oxide support is satisfactory. Suitable support pretreatment procedures comprise intimately contacting the support with the alkyl aluminum compound as by dissolving the aluminum compound in an inert solvent, e.g., inert hydrocarbons such as pentane, hexane or benzene, and washing the support with the resulting solution. As previously stated, it is considered likely that some aluminum species are incorporated into the support, as through replacement of acidic protons. However, this appears to be the principal role of the alkyl aluminum compound and no special precautions with regard to oxygen contact are required subsequent to any pretreatment since the advantages gained by pretreatment are not lost by exposure of the treated support to oxygen during storage or handling prior to introduction of the transition metal halide complex, although contact with water should be avoided.

The catalyst compositions are employed to effect the conversion of a variety of olefinic materials, but particularly are useful in the conversion of monoolefins of two or more carbon atoms having terminal or internal ethylenic unsaturation. Preferred olefins are straight-chain hydrocarbon monoolefins of from two to 10 carbon atoms as illustrated by ethylene, propylene, 1-butene, 2-butene, 2-hexene, 1-octene and 3-octene. In general, terminal olefins, i.e., alpha-olefins are more suitably employed in many olefin conversion processes than the analogous internal olefins and particularly suitable are the straight-chain or normal alpha-olefins of from two to five carbon atoms, i.e., ethylene, propylene, 1-butene and 1-pentene.

Olefin conversion processes employing the catalyst compositions of the invention are typically conducted in a fluid phase, i.e., either in the gaseous or liquid phase, in the presence or in the absence of an inert reaction diluent. When conducted in the vapor phase, inert gaseous diluents such as nitrogen, argon, helium or volatile saturated hydrocarbons, e.g., methane or ethane, are satisfactory. Illustrative liquid-phase reaction diluents include hydrocarbons and halohydrocarbons free from aliphatic carbon-carbon unsaturation such as hexane, octane, decane, cyclohexane, decahydronapthalene, benzene, toluene, chlorobenzene, methylene chloride and methylene bromide. In many modifications of a typical olefin conversion process, a portion of the product suitably serves as reaction diluent and no added reaction diluent is employed. When diluent is utilized, however, amounts up to about four moles of diluent per mole of olefin are satisfactory. The process is suitably conducted in an inert reaction environment so that the presence of reactive materials such as water and oxygen is desirably avoided. Reaction conditions are therefore substantially anhydrous and substantially oxygen-free.

The precise method of conducting an olefin conversion process is not critical. In one modification, the olefin reactant, the catalyst composition and any diluent which is employed are charged to an autoclave or similar reactor and maintained at reaction conditions for the desired reaction period. In another modification, olefin conversion is effected in a continuous manner as by passing the olefin feed, either in the vapor phase or in the liquid-phase solution, through a reactor in which the heterogeneous catalyst composition is maintained. By any modification, the olefin conversion process is conducted at moderate temperatures and pressures. Suitable reaction temperatures vary from about 0° to about 130° C., depending in part upon the particular olefin to be converted. The temperature range from about 30° to about 80° C. is preferred. The process is conducted at or above atmospheric pressure, and pressures from about 1 atmosphere to about 100 atmospheres are satisfactory. Best results are obtained when a pressure of from about 5 atmospheres to about 40 atmospheres is employed.

At the conclusion of the reaction, the product mixture is separated and the product is recovered by conventional means such as fractional distillation, selective extraction, adsorption and the like. Unreacted olefin is suitably recycled for additional conversion.

The products of the olefin conversion processes which employ the catalyst compositions of the invention are materials illustratively produced by combination of two or more molecules of the olefin reactant. In the cases where a limited number of olefin reactant molecules combine, i.e., the principal products are olefin dimers, trimers or tetramers, the olefin conversion process is termed on of oligomerization. Alternatively, process involving combination of a greater number of olefin reactant molecules are more properly termed "polymerization."

The olefin conversion products are materials of established utility and many are chemicals of commerce. The higher molecular weight products are thermoplastic polyolefins, e.g., polyethylene and polypropylene. The lower molecular weight olefinic products, e.g., olefin dimers and trimers, are converted by conventional "Oxo" processes to aldehydes of one more carbon atom which are hydrogenated to corresponding alcohols. Alternatively, such olefins are converted to secondary and tertiary alcohols as by sulfuric acid-catalyzed hydration. The $C_{12}$–$C_{20}$ alcohols thus produced are ethoxylated with ethylene oxide in the presence of a basic catalyst, e.g., sodium hydroxide, to form conventional detergents and the lower molecular weight alcohols are esterified with polyhydric acids, e.g., phthalic acid, to form plasticizers for polyvinyl chloride.

To further illustrate the catalyst compositions of the invention, the following examples are provided. It should be understood that the details thereof are not to be regarded as limitations, as they may be varied as will be understood by one skilled in the art.

EXAMPLE I

A catalyst support was prepared by heating 6.8 g. of a commercial silica-alumina of about 26 percent alumina in air at 550° C. for 4 hours and subsequently sweeping with nitrogen and washing with pentane, a pentane solution of 4 g. of triethylaluminum and additional pentane. The support was then contacted with a pentane solution of $\pi$-allyl nickel chloride until approximately 0.12 g. of nickel was present on the resulting solid. A 1.9 g. portion of the catalyst composition was placed in an autoclave equipped with a stirring device and a dip tube that allowed all but approximately 20 ml. of the contents to be forced out without opening the autoclave. To the autoclave was charged 20 ml. of chlorobenzene as solvent and 50 ml. of propylene. The temperature rose to approximately 50° C. and the pressure decreased rapidly from a maximum of 150 p.s.i.g. After a short reaction time, stirring was stopped and the solid was allowed to settle, whereupon the supernatant liquid was pressurized out of the system. This cycle was repeated 12 times to afford the overall results provided in table I.

TABLE I

| | |
|---|---|
| Temperature, °C. | 0–67 |
| Reaction Time, hr. | 0.5 |
| Pressure, p.s.i.g. | 10–150 |
| Propylene Fed, moles | 7.75 |
| Propylene Conversion, % | 96 |
| Selectivity, % | |
| Hexenes | 81 |
| Nonenes | 17 |
| Dodecenes | 2 |
| Hexene Composition, % | |
| n-Hexenes | 26.6 |
| Branched Hexenes | 73.4 |

The selectivity to product type, e.g., dimer or trimer was determined by gas-liquid chromatographic analysis of the produce mixture. A portion of the product mixture was hydrogenated to yield a saturated alkane product from which the isomeric distribution of the initial hexene composition was determined by gas-liquid chromatography of the hydrogenated material.

EXAMPLE II

A catalyst composition was produced by treating 1.6 g. of a commercial silica-alumina previously calcined at 550° C. with 7.5 millimoles (mmoles) of ethylaluminum dichloride, then with 1.24 mm. of bis($\pi$-allyl)chromium chloride dissolved in pentane and finally washing with pentane. The resulting composition, a brown solid, contained 0.5 mm. of chromium per gram of composition.

In an autoclave, 0.5 g. of this chromium-containing catalyst was contacted with 8 g. of ethylene and the mixture was maintained at 40°–50° C. for 3.7 hours, during which time the pressure, initially 420 p.s.i.g., decreased to 90 p.s.i.g. From the resulting product mixture was isolated by filtration a mixture of catalyst and 5.63 g. of polyethylene, a white granular product after vacuum drying. The conversion of ethylene to polymer was 58 percent.

EXAMPLE III

By the procedure of example II, a catalyst composition was prepared by treating in a chromatographic column 3.24 g. of a commercial silica-alumina with 25 mm. of ethylaluminum dichloride and then with 0.44 g. of bis(ethylene)rhodium(I) chloride dissolved in toluene. After washing with 50 ml. of pentane the resulting composition of top portion of the solid in the chromatographic column contained about 0.9 mm. of rhodium per gram of total solid. This catalyst composition was found to convert ethylene to a mixture of butenes in 96 percent selectivity.

EXAMPLE IV

According to the procedure of example II, 5.43 g. of a commercial silica-alumina was contacted with 27 moles of ethylaluminum dichloride in heptane and then with 0.91 g. of $\pi$-allylpalladium chloride dissolved in toluene. The resulting composition was washed with pentane and found to contain about 0.8 mm. of palladium per gram of solid.

In an autoclave, 1 g. of the composition was contacted with 10 g. of ethylene for 21 hours at a temperature of 23°–56° C. The conversion of ethylene was 90 percent with a selectivity to butene of 63 percent by weight, a selectivity to hexene of 4 percent by weight, a selectivity to octene of 23 percent by weight and a 10 percent by weight selectivity to products of 10 or more carbon atoms.

EXAMPLE V

A number of catalysts were prepared by contacting $\pi$-allyl-nickel chloride with various support materials which, in some instances, had been pretreated with an alkyl aluminum compound. The character of the supports, the alkyl aluminum compounds and the results obtained when the catalysts were employed to oligomerize lower olefins in a batch-type process similar to that of example I are provided by the data of table II.

TABLE II

| Run | 1 | 2 | 3 | 4 |
|---|---|---|---|---|
| Temperature, °C | 65 | 20–60 | 50 | 50 |
| Support, g | $SiO_2/Al_2O_3$ | $SiO_2$ | $SiO_2/MgO$ | $SiO_2/Al_2O_3$ |
| Alkylaluminum compound, g | None | $(C_2H_5)_3Al$ | $(C_2H_5)_3Al$ | $(C_2H_5)_2AlF$ |
| Ni, mmole/g. of support | 0.6 | 1 | 1 | 0.5 |
| Olefin feed | $C_3H_6$ | $C_3H_6$ | $C_2H_4$ | 1-$C_4H_8$ |
| Rate of conversion, kg. olefin/hr./g. Ni | 0.5 | 6.2 | Slow | Slow |
| Selectivity, percent: | | | | |
| Dimer | 84 | 92 | 90 | 91 |
| Trimer | 10 | 7 | 10 | 9 |
| Tetramer | 6 | 1 | | |
| Hexene composition, percent: | | | | |
| Normal | 25 | 28 | 76 | |
| Branched | 75 | 72 | 24 | |
| Octene composition, | | | | |
| Normal | | | | 23 |
| Branched | | | | 77 |

EXAMPLE VI

A catalyst was prepared by treating 4.53 g. of silica-alumina (previously calcined at 550° C.) with 28.5 millimoles of ethylaluminum dichloride in hexane followed by 2.54 millimole of π-phenylallylnickel bromide in benzene. A 2.0 g. portion of the resulting solid containing 2.2 millimoles of nickel was employed to oligomerize ethylene over a 2.5 hour period in a flow-type process through a stirred autoclave. The reaction temperature was 25°–30° C., the reaction pressure was 100 p.s.i.g. and the WHSV was 34. A 99 percent conversion of the ethylene was obtained to a product whose distribution is provided in table III.

TABLE III

Selectivity to Product, % wt.

| | |
|---|---|
| $C_4H_8$ | 16.7 |
| n-$C_6H_{12}$ | 11.2 |
| Branched $C_6H_{12}$ | 21.4 |
| N-$C_8H_{16}$ | 6.0 |
| Branched $C_8H_{16}$ | 25.8 |
| $C_{10}H_{20}$ | 11.5 |
| $C_{12}H_{24}$ | 6.1 |

We claim as our invention:

1. A thermally stable, hydrocarbon-insoluble, supported catalyst composition comprising (a) a solid, acidic refractory oxide support, said support having been pretreated with up to about 30 percent by weight based on the support of an alkyl aluminum compound of the formula $$R''_y AlX_{(3-y)}$$

wherein R'' is alkyl of up to eight carbon atoms, X is halogen of atomic number of from 17 to 35 inclusive and y is a whole number from 1 to 3 inclusive, and (b) from about 3 percent by weight to about 14 percent by weight based on total catalyst composition of π-allylnickel chloride or bis(π-allyl)chromium chloride 2. The catalyst composition of claim 1 wherein the π-allyl transition metal halide is π-allylnickel chloride.

3. The catalyst composition of claim 1 wherein the π-allyl transition metal halide is bis(π-allyl)chromium chloride.

4. The catalyst composition of claim 1 wherein the alkyl aluminum compound is triethylaluminum.

5. The catalyst composition of claim 1 wherein the alkyl aluminum compound is ethylaluminum dichloride.

* * * * *

PO-1050
(5/69)

UNITED STATES PATENT OFFICE
CERTIFICATE OF CORRECTION

Patent No. 3,620,981      Dated November 16, 1971

Inventor(s) EUGENE F. MAGOON, LAWRENCE G. CANNELL, and JOHN H. RALEY

It is certified that error appears in the above-identified patent and that said Letters Patent are hereby corrected as shown below:

At column 3, line 51, and in claim 1, the formula reading $$R'''_y AlX_{(31y)}$$

should read $$R'''_y AlX_{(3-y)}$$

Signed and sealed this 23rd day of May 1972.

(SEAL)
Attest:

EDWARD M.FLETCHER,JR.      ROBERT GOTTSCHALK
Attesting Officer      Commissioner of Patents